United States Patent [19]

Hahn

[11] 4,378,483

[45] Mar. 29, 1983

[54] DEVICE FOR MOVING A WELDING TORCH DURING THE WELDING OF SEAMS, ESPECIALLY OF CIRCUMFERENTIAL SEAMS

[75] Inventor: Günter Hahn, Obertshausen, Fed. Rep. of Germany

[73] Assignee: Messer Griesheim GmbH, Fed. Rep. of Germany

[21] Appl. No.: 213,052

[22] Filed: Dec. 4, 1980

[30] Foreign Application Priority Data

Dec. 19, 1979 [DE] Fed. Rep. of Germany ....... 2951073

[51] Int. Cl.³ .............................................. B23K 9/12
[52] U.S. Cl. ............................ 219/124.1; 219/125.11; 219/60 R
[58] Field of Search ................ 219/60 R, 60 A, 124.1, 219/125.1, 125.11; 318/90, 60, 61

[56] References Cited

U.S. PATENT DOCUMENTS

| 2,982,897 | 5/1961 | Eastcott | 318/60 |
| 3,267,251 | 8/1966 | Anderson | 219/125.1 |
| 3,702,913 | 11/1972 | Kazlvaskas et al. | 219/60 A |
| 4,163,886 | 8/1979 | Omae et al. | 219/125.11 |

*Primary Examiner*—C. C. Shaw
*Attorney, Agent, or Firm*—Connolly and Hutz

[57] ABSTRACT

A device for moving a welding torch during the welding of seams, particularly circumferential seams, includes a chassis driven by a feed motor with a feed motor control unit and includes a decelerating/accelerating device for the feed motor.

4 Claims, 2 Drawing Figures

DEVICE FOR MOVING A WELDING TORCH DURING THE WELDING OF SEAMS, ESPECIALLY OF CIRCUMFERENTIAL SEAMS

BACKGROUND OF INVENTION

The present invention concerns a device for moving a welding torch during the welding of seams, especially of circumferential seams, with a chassis, which is equipped with a feed motor and with a feed motor control unit.

Reference is made to the state of the art, as it has been known, e.g., through the West German Offenlegungsschrift No. 22 43 460. The device, according to this West German Offenlegungsschrift, has a feed motor, with which the chassis and thus also the welding torch can be moved orbitally around a pipe being welded. Practice has shown that the constancy of the feed/rotation speed that can be achieved with devices of this type is in the order of magnitude at which perfectly welded seams are not always guaranteed. These changes in the feed speed are attributed especially to the variable effects of the forces due to inertia during the movement of the chassis around a pipe being welded.

It has also been found that both in the above-described orbital chassis and in the longitudinally moving chassis, in which the feed motor is connected with the drive wheels of the chassis via transmission and gears, the play of the transmission has an effect on the constancy of the travelling speed. This effect is especially intensive during the reversal from forward motion to return motion in the case of longitudinally moving chassis, in which case velocity lags occur. Velocity jumps occur in the case of orbital chassis at the transition ascent to descent and vice versa; these also have an adverse effect on the welding process as well as on the quality of the welding.

SUMMARY OF INVENTION

It is an object of the present invention to eliminate these disadvantages of the known devices and create a device of the above-described type with which a velocity constancy permitting perfectly welded seams and a jerk-free and lag-free velocity curve can be achieved.

To solve this problem, it is proposed according to the present invention that the feed motor be equipped with a decelerating/accelerating device. Thus, it is possible to obtain a constant jerk-free and lag-free travel speed, which is not affected by the transmission play, and thus to avoid welding defects which can be attributed to changes in the travel speed. The decelerating/accelerating device preferably has a servomotor which is mechanically coupled with the chassis motor, and a load current set-point that is dependent on the actual current value of the feed motor can be preferably admitted to the servomotor.

THE DRAWINGS

FIG. 1 schematically illustrates a device according to the present invention; and
FIG. 2 illustrates a current/velocity diagram.

DETAILED DESCRIPTION

Figure 1:
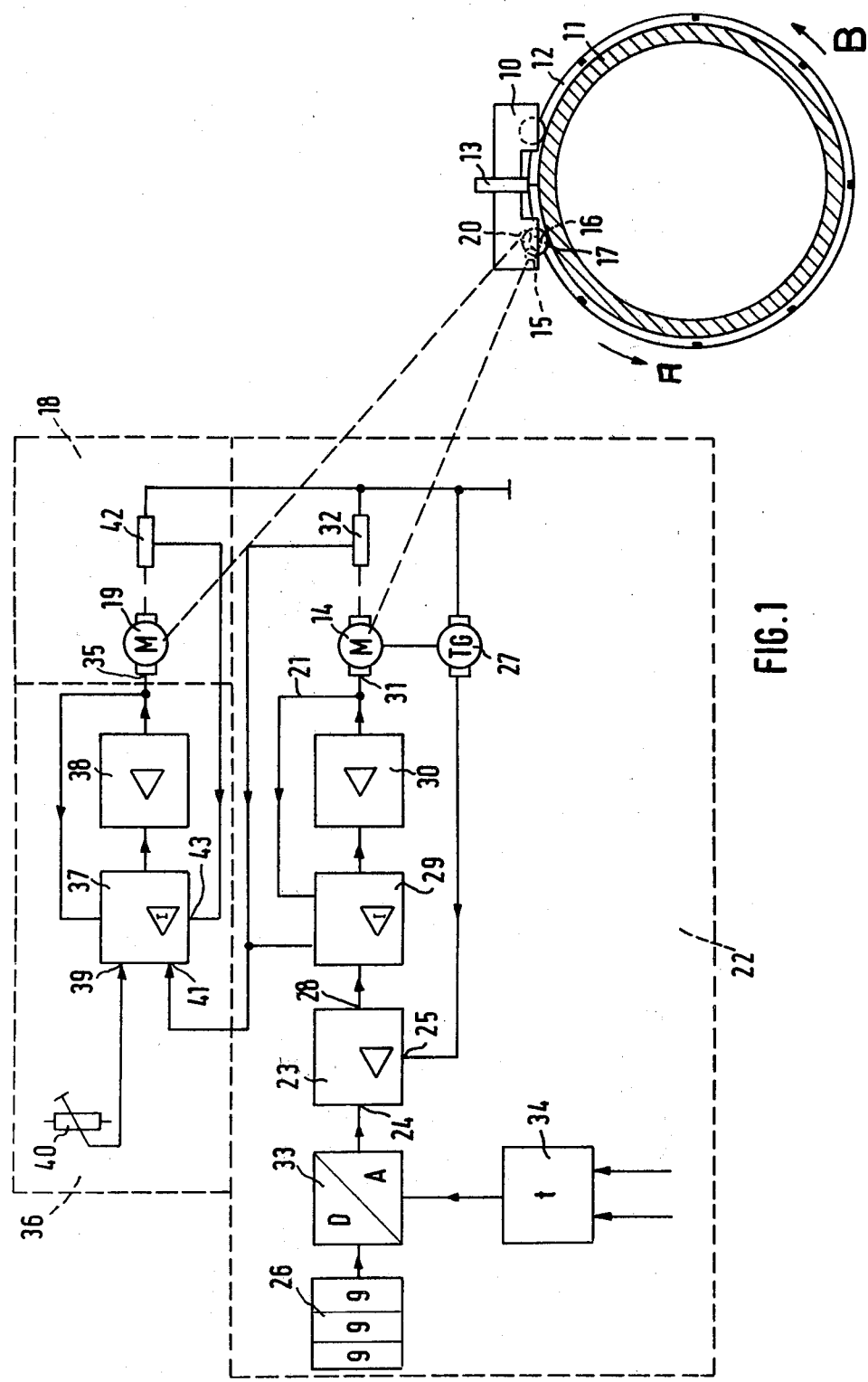

A chassis 10, which is held in a guide 12 laid around a pipe 11, and which thus can be moved orbitally around the pipe 11, is shown schematically in FIG. 1. A welding torch 13, as well as burner adjusting and swinging devices which are not shown in detail, as well as a welding rod delivery spool are mounted on the chassis in the known manner. The torch 13 is connected with a welding power source (not shown) across a hose pack (not shown in detail), The drive of the chassis 10 has a feed motor 14, whose rotor is connected with a gear 15, which engages in a drive gear 16, which is in connection with the chassis wheel 17.

The feed motor 14 is equipped with a decelerating-/accelerating device 18, which has a servomotor 19, whose rotor is also in mechanical connection with the drive gear 16 across a gear 20. The gear 20 and the gear 15 can be of identical design. It is, of course, also possible to couple the motors 14 and 19 with each other by a mechanical coupling other than the described mechanical coupling of the feed motor 14 with the servomotor 19 across the gears 15, 16 and 20. Thus, for example, it is advantageously possible to connect the motors 14 and 19 with each other mechanically and to engage only one of the rotors with the drive gear 16 across a gear.

The feed motor 14 is provided with a feed motor control unit 22 which has a rotation speed set-point/actual value comparator 23, one input 24 of which is connected with a setting means 26, and the other input 25 of which is connected with rotational speed actual value pick-up 27. The output 28 of the amplifier 23 is connected with the input 31 of the feed motor 14 through the intermediary of a motor current variable-gain amplifier 29 and of a motor end stage 30. The variable-gain current amplifier 29 receives the signal of a motor current actual value pick-up 32 as well as a motor voltage actual value signal (wire 21). The setting means 26 is designated as a digital setting means and is connected with the variable-gain amplifier 23 across a digital-analog converter 33, which can be switched on and off via a timer 34.

The input 35 of the servomotor 19 is equipped with a servomotor control unit 36, which has a variable-gain motor current amplifier 37 with a succeeding end stage 38. The input 39 of the amplifier 37 is connected with a setting means 40, while the input 41 of the variable-gain amplifier 37 is in connection with the feed motor current actual value pick-up 32. The servomotor actual value pick-up is designated by 42 and is connected with the input 43 of the variable-gain amplifier 37.

The mode of operation of the above device will be explained below in more detail.

The velocity set-point is set via the three digital switches of the setting means 26 as provided in the example, which setting means there is thus a setting range of max. 999 mm × minute$^{-1}$. In the digital-analog converter 33, the preselected velocity is converted into a proportional analogous voltage and is fed to the follow-up amplifiers 23, 29, 30 when the timer 34 releases the signal path.

Thus, the time between the arrival of a start impulse, which is supplied, e.g., by a program transmitter, and the release of the follow-up amplifiers 23, 29, 30 can be adjusted to the practical needs (chassis delay after application of the welding current) by means of the timer 34.

The feed motor 14 is then moving at a rotational speed corresponding to the set-point. To regulate and stabilize the rotational speed, the voltage supplied by the actual value pick-up 27, which is preferably designed as a tacho-alternator, is sent to the rotational speed actual value comparator 23 for compensation, and, on the other hand, the variable-gain motor current amplifier 29 contains a control potential, which is proportional to the voltage drop on the feed motor 14. The set-point voltage for the amplifier 29 appears at the output of the comparator 23. This voltage corresponds to the voltage difference between the set-point voltage and the actual value of the rotational speed supplied by the tacho-alternator.

The voltage drop on the current actual value pick-up 32 is porportional to the actual value of the current and is sent to the variable-gain current amplifier 29; it is compared in the latter with the nominal voltage generated by the amplifier 23. Due to this linkage, which can also be designated as superposed regulation, the variable-gain amplifier 23 is operating during normal operation whereas the rheostat 29 is set into action in the case of, e.g., overload, and stablilzes the motor current.

The servomotor 19 is mechanically coupled with the feed motor 14 as described above. Thus, in the normal case, the servomotor 19 receives a torque that is opposite to that of the feed motor 14. The value of the torque is determined by the negative voltage set on the auxiliary setting means (potentiometer) 40 and by the positive voltage drop on the current actual value pick-up 32. Both voltages are sent to the inputs 39, 41 of the variable-gain amplifier 37, there form a set-point current value and are compared by the auxiliary current actual value pick-up 42 with the actual current value. The armature voltage of the servomotor 19 is additionally fed regeneratively to the variable-gain amplifier 37 to avoid hunting.

The above-described circuit brings about a reduced voltage drop on the actual value pick-up 32 during descent (see arrow A in FIG. 1) because of the lower current consumption of the feed motor 14 so that the negative set-point value predominates in the variable-gain amplifier 37. The consequence of this is an increase in the negative torque of the servomotor 19. The feed motor 14 is thereby prevented from reversing from drive to deceleration so that it is loaded permanently. In the case of ascent (see arrow B in FIG. 1), the positive set-point current value from the pick-up 32 prevails over the negative set-point load value from the potentiometer 40. In this case the servomotor 19 assists the feed motor 14 with a positive torque.

Figure 2:
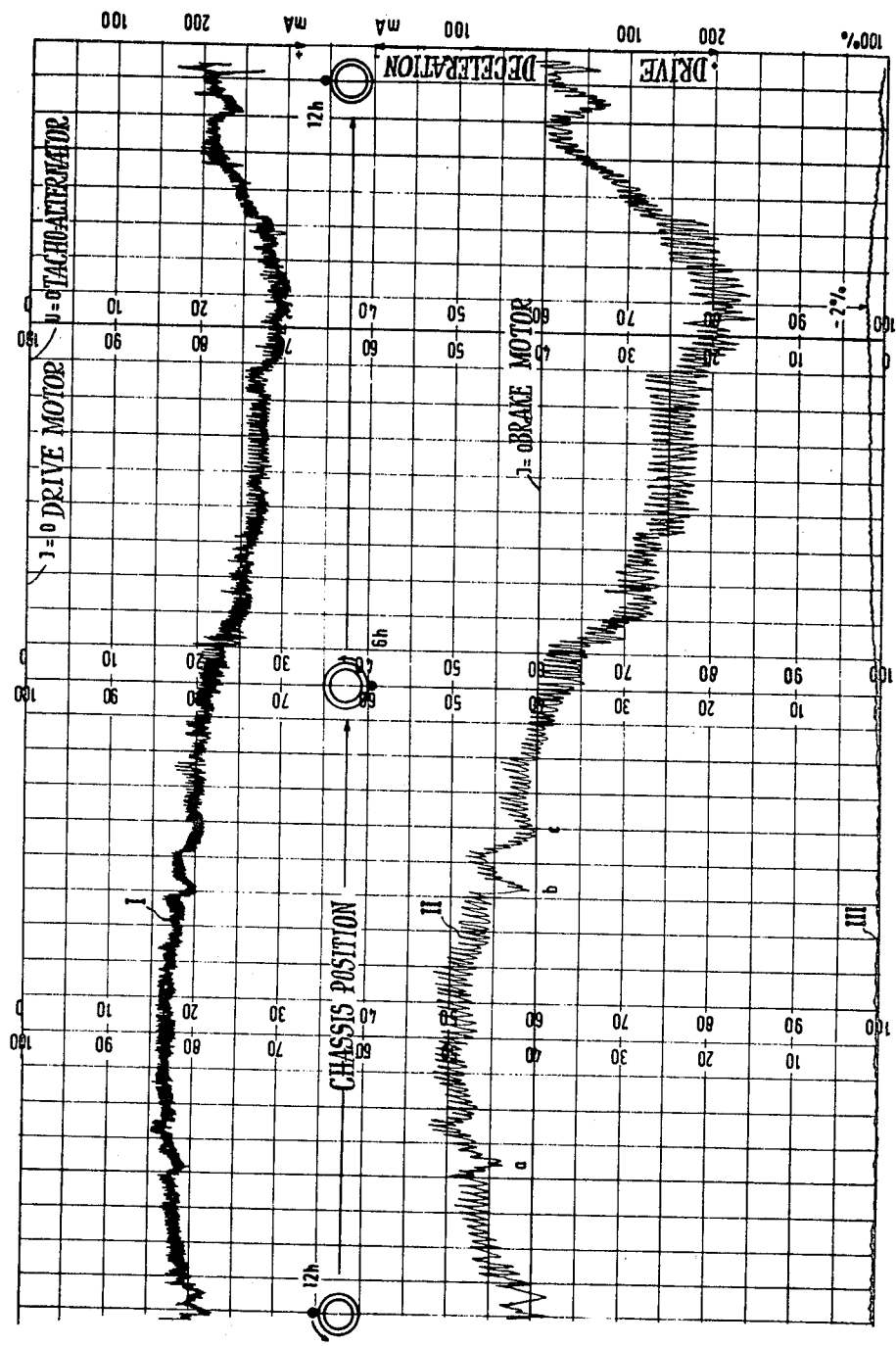

The relationships between the feed motor current (Curve I), the servomotor current (Curve II) and the travel speed (Curve III) as a function of the position of the chassis 10 on a pipe circumambulated to the left, beginning at the 12-o'clock position are shown in FIG. 2. As is shown by Curve I, the feed motor 14 also consumes current during the descent, i.e., it does not reverse from drive to deceleration. The servomotor (Curve II) acts as a generator until shortly before the 6-o'clock position, i.e., it decelerates and then, i.e., during ascent, it takes up a current of up to 200 mA, i.e., it supplies a considerable additional torque. The travel speed (Curve III), traced as a tacho-alternator (generator) voltage shows a jerk-free and lag-free course and deviates from the nominal value during ascent by only −2%. In addition, while Curves I through III were being traced, the chassis was pulled strongly via the hose pack against the travel direction at times a, b and c. The effect of this on the travel speed is clearly <0.5% and thus negligible. These slight deviations of the chassis speed from the set-point value, however, cause no welding defects so that the task formulated in the beginning is solved by the present invention.

In summary the invention relates to a seam welding device which has a chassis 10, which has a feed motor 14 and a feed motor control unit 22 for moving the welding torch 13. In order to achieve a travel speed constancy ensuring perfect welded seams as well as a jerk-free and lag-free speed, the feed motor 14 is provided with an accelerating/decelerating device 18 which preferably has a servomotor 19, which is coupled mechanically with the feed motor 14 and to which a set-point load current that is dependent on the actual current value of the feed motor 14 can be applied.

What is claimed is:

1. In a device for moving a welding torch during the welding of circumferential seams and the like, which includes a chassis driven by a feed motor having a drive motor control unit and an auxiliary motor, characterized in that said device includes means for supplying an actual current to said feed motor, means for supplying a load current to said auxillary motor, means for sensing the actual current, means for controlling the load current based on the sensed actual current, and said feed motor and said auxiliary motor being coupled together in such a manner that the load current applied on said auxiliary motor is dependent on the actual current value of said feed motor.

2. Device according to claim 1, characterized in that said feed motor control unit has a rotational speed set-point value/actual value comparator whose inputs are connected with a setting means and with a rotational speed actual value pick-up and whose output is connected with the input of said feed motor through the intermediary of a variable-gain motor current amplifier and of a motor end stage, and in which control unit the signal of the feed motor current actual value pick-up and the feed motor voltage actual value can be applied on the variable-gain current amplifier.

3. Device according to claim 2, characterized in that said auxiliary motor is in connection with a variable-gain motor current amplifier with a succeeding end stage, the inputs of said variable-gain amplifier being connected with a setting means and with the feed motor current actual value pick-up.

4. Device according to claim 3, characterized in that said setting means supplies a negative set-point value.

* * * * *